United States Patent
Kapocs et al.

(10) Patent No.: US 11,899,488 B2
(45) Date of Patent: Feb. 13, 2024

(54) PEDAL SYSTEM

(71) Applicant: Volvo Car Corporation, Gothenburg (SE)

(72) Inventors: Marcel Kapocs, Gothenburg (SE); Mickael Larsen, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 17/711,162

(22) Filed: Apr. 1, 2022

(65) Prior Publication Data

US 2022/0334607 A1 Oct. 20, 2022

(30) Foreign Application Priority Data

Apr. 15, 2021 (EP) ..................................... 21168708

(51) Int. Cl.
  *G05G 1/40* (2008.04)
  *B60K 26/02* (2006.01)
  *B60T 7/06* (2006.01)

(52) U.S. Cl.
  CPC ............... *G05G 1/40* (2013.01); *B60K 26/02* (2013.01); *B60T 7/06* (2013.01); *B60K 2026/026* (2013.01)

(58) Field of Classification Search
  CPC .. G05G 1/30; G05G 1/32; G05G 1/34; G05G 1/36; G05G 1/38; G05G 1/40; G05G 1/405; G05G 1/44; G05G 1/445; B60K 26/02; B60K 2026/024; B60K 2026/026; B60R 21/09; B60T 7/04; B60T 7/06; B60T 7/065
  See application file for complete search history.

(56) References Cited

U.S. PATENT DOCUMENTS 6,182,525 B1 * 2/2001 Bowers ................. B60K 23/02
  180/274
6,324,939 B1 * 12/2001 Cicotte ................. G05G 1/405
  74/512

(Continued)

FOREIGN PATENT DOCUMENTS

CN   210000309 U    1/2020
DE   10354377 A1 * 6/2005 ............. B60K 23/02

(Continued)

OTHER PUBLICATIONS

"All You Need to Know About Linear Stepper Motors, Their Actuators, and Their Applications," Olson, Published on Venture Manufacturing Company Website on Jun. 28, 2019, url :< https://www.venturemfgco.com/blog/ know-about-linear-stepper-motors-actuators-and-applications/>.*

(Continued)

*Primary Examiner* — Adam D Rogers
(74) *Attorney, Agent, or Firm* — Clements Bernard Walker; Christopher L. Bernard

(57) ABSTRACT

A pedal system for a vehicle, a vehicle including such a pedal system, a method for manufacturing such a pedal system and a method for operating such a pedal system. The pedal system includes a pedal arm, a support member, a first locking unit and a second locking unit. The pedal arm is arranged at the support member pivotably around the support member. The first locking unit is arranged at the support member and couplable with the pedal arm to move the pedal arm to a first position. The second locking unit is connected to the pedal arm to release the pedal arm to a second position. The first locking unit is different from the second locking unit.

13 Claims, 4 Drawing Sheets

(56) References Cited

U.S. PATENT DOCUMENTS

| | | | |
|---|---|---|---|
| 7,000,722 B2 | 2/2006 | Artis et al. | |
| 9,989,987 B2 * | 6/2018 | Fujiwara | G05G 1/38 |
| 10,906,514 B1 | 2/2021 | Kim et al. | |
| 10,994,611 B1 * | 5/2021 | Kim | G05G 5/28 |
| 11,052,856 B1 * | 7/2021 | Kim | B60R 21/09 |
| 2020/0257329 A1 | 8/2020 | Kihara et al. | |
| 2020/0317167 A1 * | 10/2020 | Ghaffari | G05D 1/0061 |
| 2021/0284106 A1 * | 9/2021 | Kim | B60T 7/06 |
| 2022/0297650 A1 * | 9/2022 | Hokuto | B60T 8/4086 |

FOREIGN PATENT DOCUMENTS

| | | | |
|---|---|---|---|
| DE | 102018128014 A1 * | 5/2020 | |
| JP | 2021094898 A * | 6/2021 | |
| KR | 20180068599 A | 6/2018 | |
| WO | 20190199204 A1 | 10/2019 | |

OTHER PUBLICATIONS

Machine Translation of DE 103 54 377.*
Machine Translation of DE 10 2018 128 014.*
Machine Translation of JP 2021-094898.*
Sep. 24, 2021 Extended European Search Report issued in International Application No. 21168708.2.

* cited by examiner

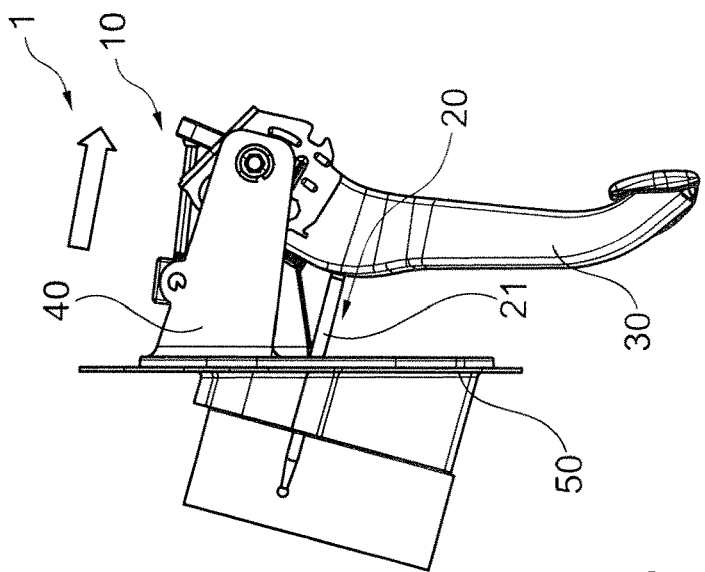
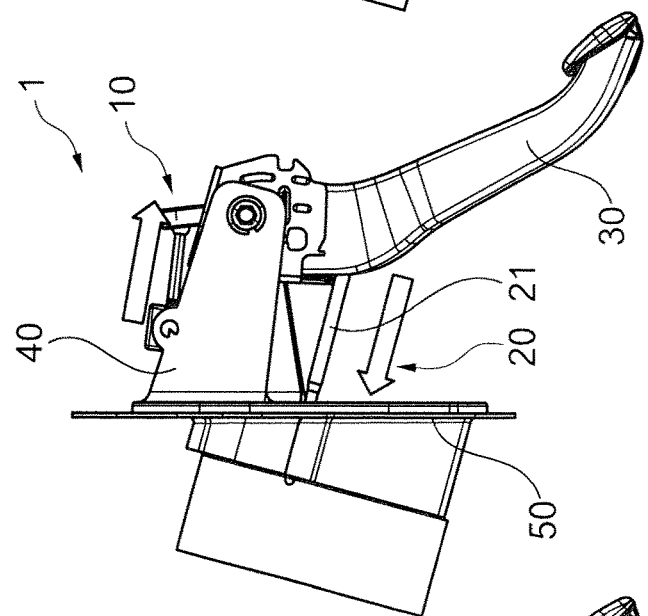
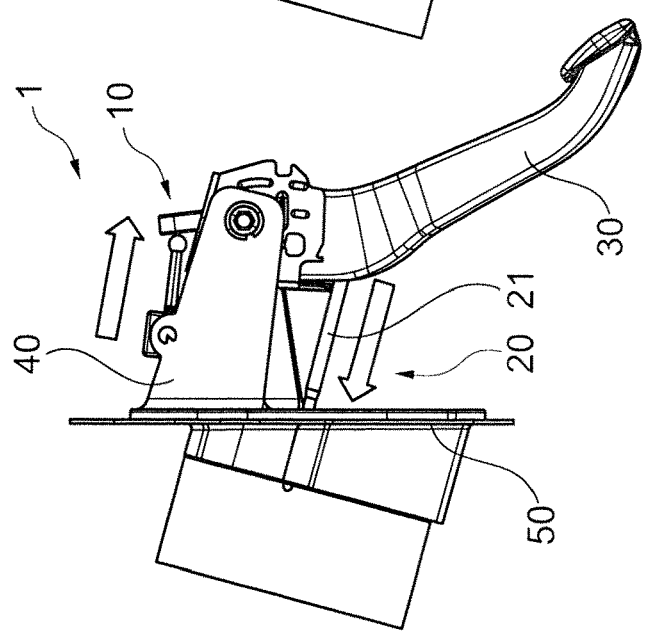

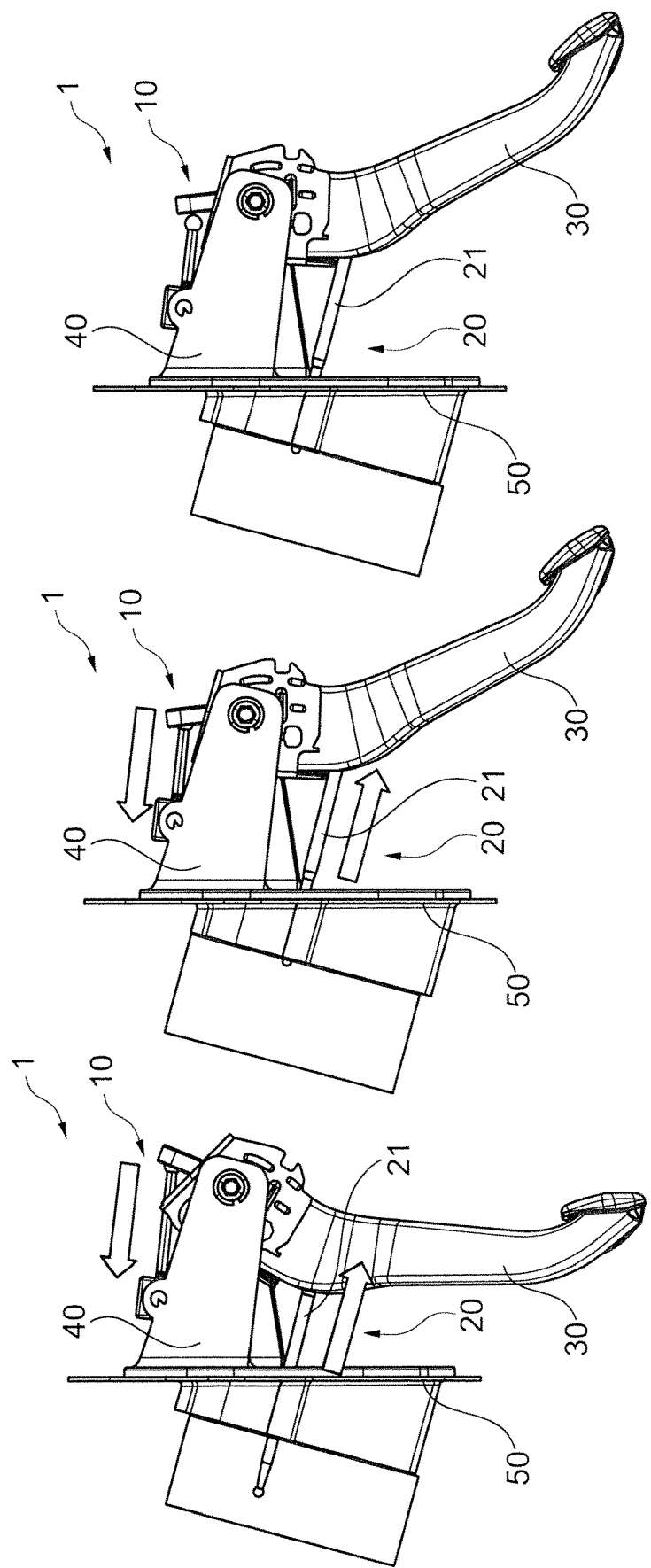

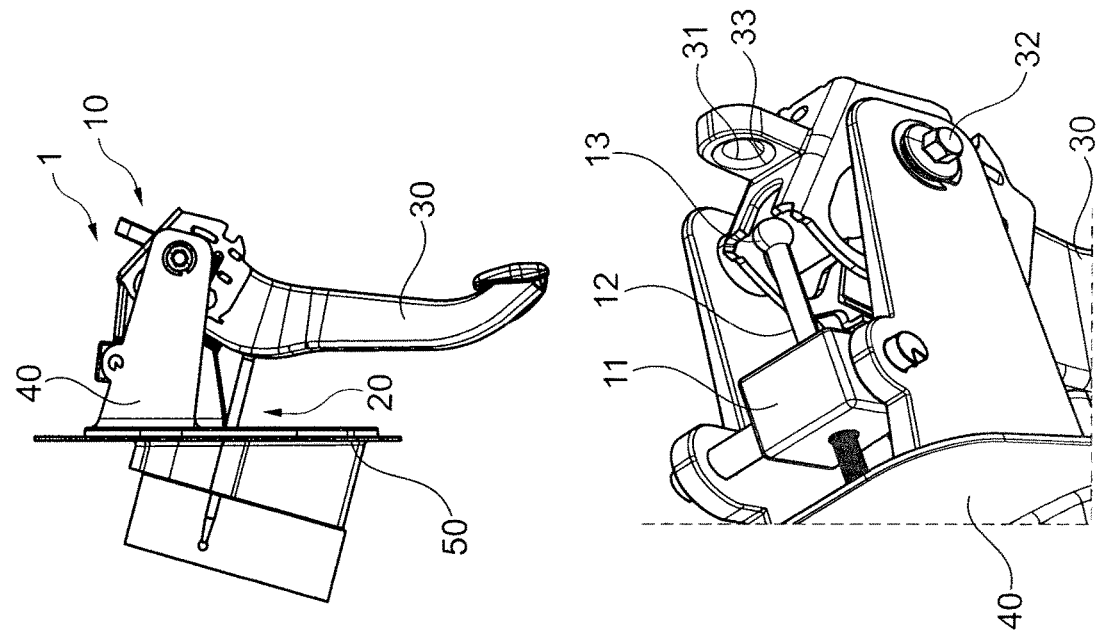
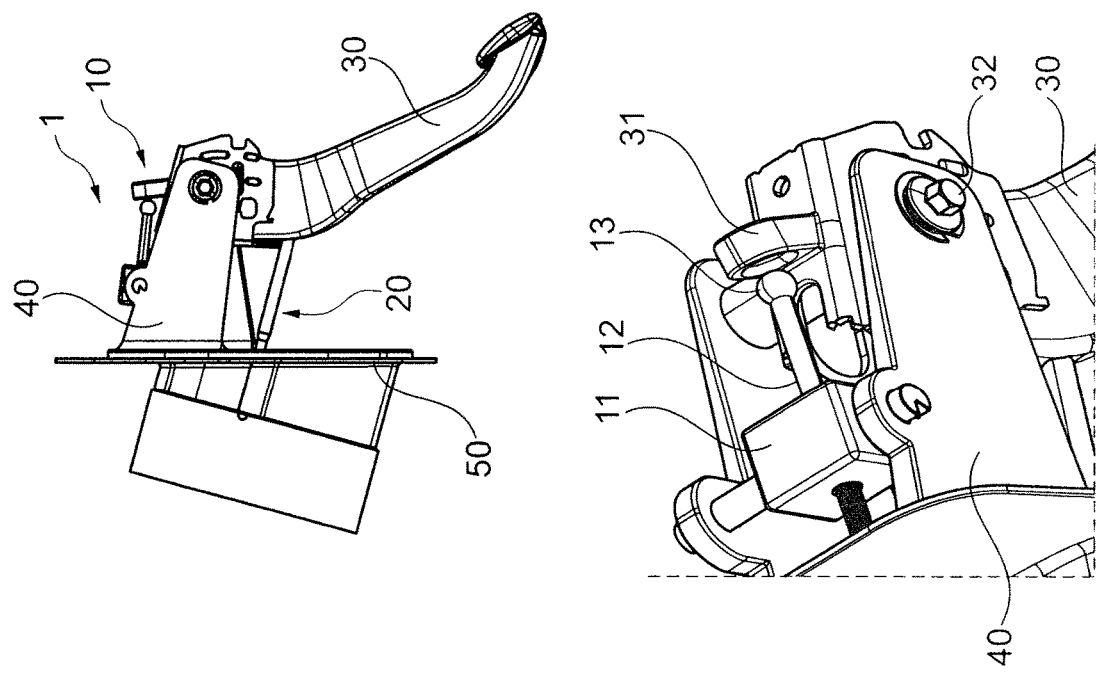
Fig. 4a
Fig. 4b

PEDAL SYSTEM

CROSS-REFERENCE TO RELATED APPLICATION

The present disclosure claims the benefit of priority of European Patent Application No. 21 168 708.2, filed on Apr. 15, 2021, and entitled "PEDAL SYSTEM," the contents of which are incorporated in full by reference herein.

TECHNICAL FIELD

The present disclosure relates to a pedal system for a vehicle, a vehicle including such a pedal system, a method for manufacturing such a pedal system and a method for operating such a pedal system.

BACKGROUND

Autonomous driving technology for a vehicle is making significant progress. The autonomous driving technology allows a driver to reduce manual controls on driving the vehicle and provides a comfort travel. The autonomous driving technology is categorized into numerical levels ranging from zero, corresponding to no automation with full human control, to five, corresponding to full automation with no human control. In the higher level of the vehicle automation such as four or five, the driver may not need to pay attention to operate or control the vehicle manually, which means the vehicle is in a fully automatic driving state.

In such a case, the driver may require more comfort during staying in the vehicle, for instance more space in a compartment of the vehicle. Specifically, the driver may desire more flexibility in the leg or foot area, since the driver may not need to actuate an accelerator pedal and/or a brake pedal by herself or himself.

SUMMARY

Hence, there may be a need to provide an improved pedal system, which provides more space, thus more comfort for a driver.

The problem is solved by the subject matter of the present disclosure. It should be noted that the aspects of the disclosure described in the following apply to the pedal system for a vehicle, a vehicle including such a pedal system, a manufacturing method for such a pedal system and an operating method for such a pedal system.

According to the present disclosure, a pedal system for a vehicle is presented. The pedal system includes a pedal arm, a support member, a first locking unit and a second locking unit. The pedal arm is arranged at the support member pivotably around the support member. The first locking unit is arranged at the support member and couplable with the pedal arm to move the pedal arm to a first position. The second locking unit is connected to the pedal arm to release the pedal arm to a second position. The first locking unit is different from the second locking unit.

The pedal system according to the present disclosure provides more space in a foot area, more ergonomic and comfortable seat for the driver. The pedal arm of the pedal system may be movable between the first position and the second position depending on use of the pedal arm and/or a driving mode of the vehicle. For instance, in case of an autonomous driving of the vehicle, the pedal arm may not be actuated by the driver. Thus, by pivoting the pedal arm in a position, in which the pedal arm may be retracted or stowed, the driver may gain more space and driver may not be interfered by the exposed pedal system. On the contrary, in case of a manual driving of the vehicle, the driver needs to actuate the pedal arm. Thus, the pedal arm may revert to its deployed and/or operating position. In other words, the pedal system may be adjustable with respect to a driving mode of the vehicle. Accordingly, a flexible but safe use of the pedal system may be ensured.

Further, such a pedal system may be easily manufactured at low costs, since, the conventional pedal system may be used without reconstructing the pedal system.

The support member may be arranged at a floor portion of the vehicle. The pedal arm may be fixedly held at the support member by a shaft which may be inserted between the pedal arm and the support member and extending through them. The shaft may be, for example a screw, a pin or the like and may form a rotation axis of the pedal arm. In other words, the pedal arm may be pivoted around the shaft such that the pedal arm may be tilted away from the support member and/or the floor portion of the vehicle or the pedal arm may approach to the support member and/or the floor portion of the vehicle.

The first locking unit may be arranged at an upper portion of the support member relative to the rotation axis of the pedal arm and the second locking unit may be arranged on an opposite side of the first locking unit relative to the rotation axis, i.e. at a lower portion relative to the rotation axis of the pedal arm.

The first locking unit may be disconnected to the pedal arm while the first locking unit is not actuated. The first locking unit may be connected to a control unit such as electronic control unit (ECU). In case the first locking unit receives information from the control unit that the pedal arm needs to be moved to a first position, the first locking unit may be coupled with the pedal arm to pivot it to the first position. Whereas, the second locking unit may be steadily connected to the pedal arm and allow the pedal arm to pivot to the second position. In other words, two separate locking units may function differently to move the pedal arm between the first position and the second position.

In an embodiment, the first locking unit and the second locking unit are arranged between the pedal arm and the floor portion of the vehicle. Hence, only the pedal arm, but no other components of the pedal system is exposed to the foot area of the driver to provide a maximum available space.

In an embodiment, the first locking unit includes an actuator and a rod element and the pedal arm includes a rod coupling element. The actuator is configured to actuate the rod element in order to couple with the rod coupling element of the pedal arm.

The first locking unit may receive information from the control unit in which state the vehicle travels. As soon as the vehicle is shifted to an autonomous driving mode, the actuator connected to the rod element may move the rod element towards the rod coupling element of the pedal arm. The actuator may be an electric motor. After coupling with the rod coupling element, the actuator may further press the rod element, subsequently the rod coupling element with a predefined force to pivot the pedal arm around the rotation axis of the pedal arm to the first position.

In an embodiment, the rod coupling element may be arranged at a top portion of the pedal arm. In other words, the pedal arm may include a pedal interface at one end and the rod coupling element at the other end. Still in other words, the rod coupling element may be arranged on an opposite side of the pedal interface relative to the rotation axis of the pedal arm. Accordingly, when the rod element of the first locking unit extends towards the rod coupling element and presses it away from the support member, a lower portion of the pedal arm relative to the rotation axis may be pivoted in a direction of the support member and/or the floor portion of the vehicle.

In an embodiment, the rod element includes a protrusion at an end portion facing the rod coupling element and the rod coupling element includes a groove formed corresponding to a shape of the protrusion. The rod element of the first locking unit may include a first end connected to the actuator and a second end facing the rod coupling element. The second end of the rod element may include a protrusion, which may be formed bigger than a diameter of a cross section of the rod element. However, the protrusion may also be smaller than the diameter of a cross section of the rod element.

The protrusion of the rod element may include any shape such as circular, rectangular and/or curved shape. The groove of the rod coupling element may be formed such that the protrusion of the rod element fits into the groove. In other words, the groove of the rod coupling element may be able to at least partially surround or completely receive the protrusion. Accordingly, the force exerted by the actuator and transferred via the rod element of the first locking unit may be reliably transferred to the groove and rod coupling element, subsequently to the pedal arm in order to ensure the movement of the pedal arm to the first position.

In an embodiment, the protrusion of the rod element is ball-shaped and the groove of the rod coupling element has a concave shape. The concave groove of the rod coupling element may suitably receive the ball-shaped end of the rod element to allow a linear force transfer, which is exerted by the actuator. Hence, the force may be transferred to the pedal arm without any loss to pivot the pedal arm to the first position.

In an embodiment, the first locking unit is configured to lock the pedal arm in the first position. The first locking unit may be configured not only to move the pedal arm to the first position by pressing the rod coupling element but also to maintain the pedal arm in the first position by continuously pressing the rod coupling element with the rod element. Hence, the pedal arm may be secured in the first position and may not pivot back in the direction of the second or previous position.

In an embodiment, the second locking unit includes a spring element, which is biased while the pedal arm is in the first position. When the rod element is coupled with the rod coupling element and moves the pedal arm to the first position, the pedal arm may press the second locking unit and/or the spring element in the direction of the floor portion of the vehicle.

Since the rod coupling element may be arranged at an upper portion of the pedal arm relative to the rotation axis of the pedal arm, the lower portion of the pedal arm is pivoted in an opposite direction to the upper portion of the pedal arm around the rotation axis. In other words, if the rod element presses the rod coupling element away from the support member, the lower portion of the pedal arm may be pivoted to the support member and/or the floor portion of the vehicle and press the spring element arranged between the pedal arm and the floor portion. Accordingly, the press force of the actuator applying on the rod element and the press force of the pedal arm biasing the spring element may be exerted in an opposite direction relative to each other. The press force exerted by the actuator of the first locking unit may be strong enough to press the spring element and maintain it biased while the pedal arm is locked in the first position.

In an embodiment, the first locking unit is configured to exert higher force than the second locking unit to the pedal arm. In other words, the press force exerted by the actuator of the first locking unit may be higher than a spring force of the spring element such that the first locking unit may maintain the pedal arm in the first position and simultaneously maintain the spring element in a biased state. For instance, the actuator of the first locking unit may exert press force of about 300 N, whereas the spring element may have a spring force of about 200 N.

In an embodiment, the first position is a locked position, in which the pedal arm is retracted, and the second position is a released position of the pedal arm. In case of an autonomous driving of the vehicle, the pedal arm may be pivoted to the locked position. In particular, the first locking unit may press the rod coupling element of the pedal arm in order to pivot the pedal arm around the rotation axis in the direction of the floor portion of the vehicle. Simultaneously, the spring element, which may be arranged between the pedal arm and the floor portion, may be biased by the retracted pedal arm. Additionally, the pedal arm may be locked in the retracted position by maintaining pressing the rod coupling element. Hence, more space in the foot area of the driver may be provided.

If the vehicle is shifted to a manual driving mode, the press force of the rod element onto the rod coupling element may be reduced by the actuator. Accordingly, the biased spring element may be released and the pedal arm may be pivoted to the released position such that the driver may be able to manually operate the pedal arm.

In an embodiment, the actuator is a step motor, which is configured to gradually release the second locking unit to the second position. When the first locking unit receives information from the control unit that the vehicle leaves the autonomous driving state, the actuator may reduce the press force applied on the rod element to release the pedal arm from the first, i.e. locked position. However, if the actuator promptly removes the press force and/or promptly retracts the rod element, the pedal arm may be bounced to the released position, i.e. operating position, which may annoy or even injure the driver.

The step motor enables that the pedal arm may be smoothly released to the second position. Accordingly, the step motor reduces the press force applied on the rod element gradually and the rod element is gradually and slowly separated from the rod coupling element of the pedal arm. For instance, the pedal arm may be deployed from the first position to the second position in about 10 seconds. Hence, a safe release of the pedal arm to the second position may be ensured. The actuator may be also a synchronous motor, a servomotor, an electric linear step motor, a DC motor or the like.

In an embodiment, the rod element is disconnected from the pedal arm and/or the rod coupling element in the second position. In other words, during a manual operation of the pedal arm by the driver, the rod element and/or the first locking unit may be separated from the pedal arm to allow the driver to actuate the pedal arm reliably.

In an embodiment, the pedal system is connected to a brake system. Accordingly, the pedal system may be a brake pedal system, wherein the pedal arm may be pivotable between the retracted position and the deployed/released position with respect to the driving mode of the vehicle.

According to the present disclosure, a vehicle is presented. The vehicle includes a pedal system as described above. The vehicle further includes a driver assistance system having an autonomous driving function. The driver assistance system may enable the vehicle at least assisting driving or even autonomously driving, which may relieve the driver. The autonomous driving function may be, for example cruise control, automatic parking, pre-crash system, lane control, vehicular communication systems, etc.

In an embodiment, the vehicle further includes a control unit configured to send a signal to the pedal system for moving the pedal arm to a first position, when an autonomous driving function is active and/or to send a signal to the pedal system for releasing the pedal arm to a second position, when the autonomous driving function is deactivated. As soon as the first locking unit receives the signal of the autonomous driving of the vehicle from the control unit, the actuator connected to the rod element may move the rod element towards the rod coupling element of the pedal arm. After coupling with the rod coupling element, the actuator may further press the rod element, subsequently the rod coupling element with a predefined force to pivot the pedal arm around the rotation axis of the pedal arm to the locked position. If the first locking unit receives the signal of deactivation of the autonomous driving, the actuator may reduce the press force applied on the rod element gradually to smoothly deploy the pedal arm to the released position.

According to the present disclosure, a method for manufacturing a pedal system is presented. The method includes, not necessarily in this order:
 arranging a pedal arm at a support member pivotably around the support member,
 arranging a first locking unit at the support member, and connecting a second locking unit to the pedal arm.
The first locking unit is couplable with the pedal arm to move the pedal arm to a first position and the second locking unit is configured to release the pedal arm to a second position. The first locking unit is different from the second locking unit.

According to the present disclosure, a method for operating a pedal system in a vehicle is presented. The method includes, not necessarily in this order:
 sending a signal to a first locking unit, when an autonomous driving function being activated,
 actuating the first locking unit to couple the first locking unit with the pedal arm and move the pedal arm to a first position,
 locking the pedal arm in the first position by means of the first locking unit,
 sending a signal to the first locking unit, when the autonomous driving function being deactivated, and
 moving the pedal arm to a second position by gradually releasing a second locking unit.

Accordingly, the pedal system according to the present disclosure provides more space in a foot area, more ergonomic and comfortable seat for the driver. A position of pedal arm of the pedal system may be adjustable between the first/locked position and the second/released position depending on a driving mode of the vehicle. Hence, a flexible but safe use of the pedal system may be ensured.

According to the present disclosure, a computer program element for operating a pedal system may be also presented. The computer program element is adapted to perform the operating method as described above, which when being executed by a processing element.

It should be noted that the above embodiments may be combined with each other irrespective of the aspect involved. Accordingly, the method may be combined with structural features and, likewise, the system may be combined with features described above with regard to the method.

These and other aspects of the present embodiments will become apparent from and elucidated with reference to the embodiments described hereinafter.

BRIEF DESCRIPTION OF THE DRAWINGS

Exemplary embodiments will be described in the following with reference to the following drawings.

FIGS. 1a, 1b, 1c show schematically and exemplarily an embodiment of a pedal system according to the present disclosure.

FIGS. 3a, 3b, 3c show schematically and exemplarily an embodiment of a pedal system according to the present disclosure.

FIGS. 4a, 4b show schematically and exemplarily an embodiment of a pedal system according to the present disclosure.

DESCRIPTION OF EMBODIMENTS

Figure 2C:
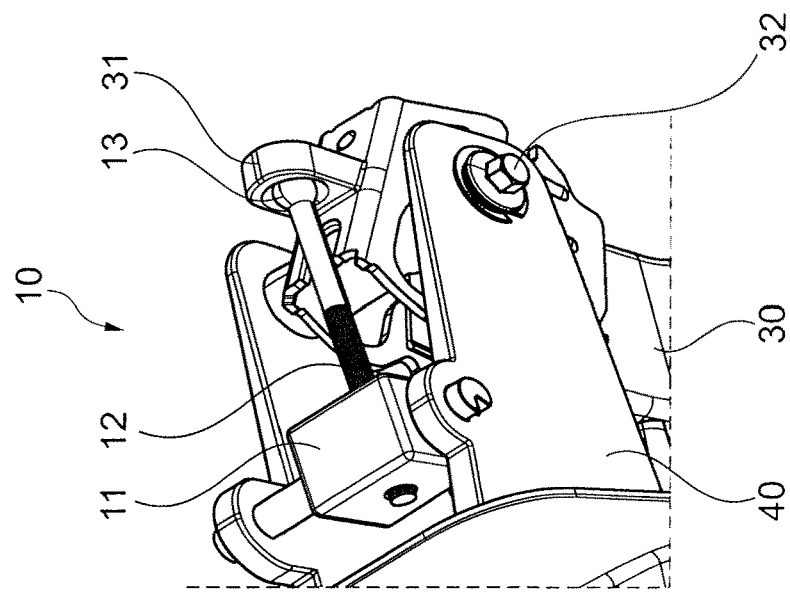
FIGS. 2a, 2b, 2c show schematically and exemplarily a cut-out objective view of an embodiment of a pedal system according to the present disclosure.

FIGS. 1a to 1c show a pedal system 1 according to the present disclosure. The pedal system 1 may be connected to a brake system or an accelerator system. The pedal system 1 includes a pedal arm 30, a support member 40, a first locking unit 10 and a second locking unit 20. The pedal arm 30 is arranged at the support member 40, which is attached to a floor portion 50 of the vehicle. The pedal arm 30 is engaged with the support member 40 by a shaft, which forms a rotation axis 32 of the pedal arm 30. Preferably, the rotation axis 32 is arranged at a top portion of the pedal arm 30 such that the substantially entire pedal arm 30 is pivotable around the rotation axis 32 relative to support member 40 and/or the floor portion 50 of the vehicle.

The first locking unit 10 is arranged at an upper portion of the support member 40 relative to the rotation axis 32 of the pedal arm 30. In other words, the first locking unit 10 is disposed in the support member 40 in an opposite side of an extension direction of the pedal arm 30 relative to the rotation axis 32. The first locking unit 10 includes an electric motor 11 and a rod element 12 connected to the electric motor 11. The electric motor 11 may be, for example a synchronous motor, a servomotor, an electric linear step motor, a DC motor, preferably a step motor. The electric motor 11 is configured to provide press force stepwise, i.e. gradually increasing and/or reducing force applied on the rod element 12.

The first locking unit 10 may be connected to an electronic control unit (not shown) of the vehicle and may receive a signal from the control unit if an autonomous driving is activated or deactivated. In case of the autonomous driving of the vehicle, the electric motor 11 applies press force on the rod element 12 to advance the rod element 12 in a linear direction. The pedal arm 30 includes a rod coupling element 31 at its top portion to receive the extending rod element 12.

Figure 2B:
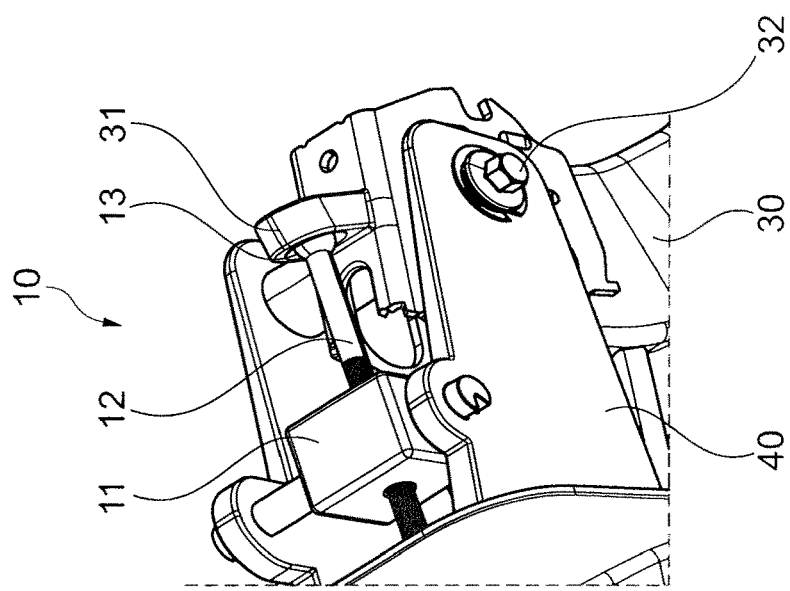
Figure 2A:
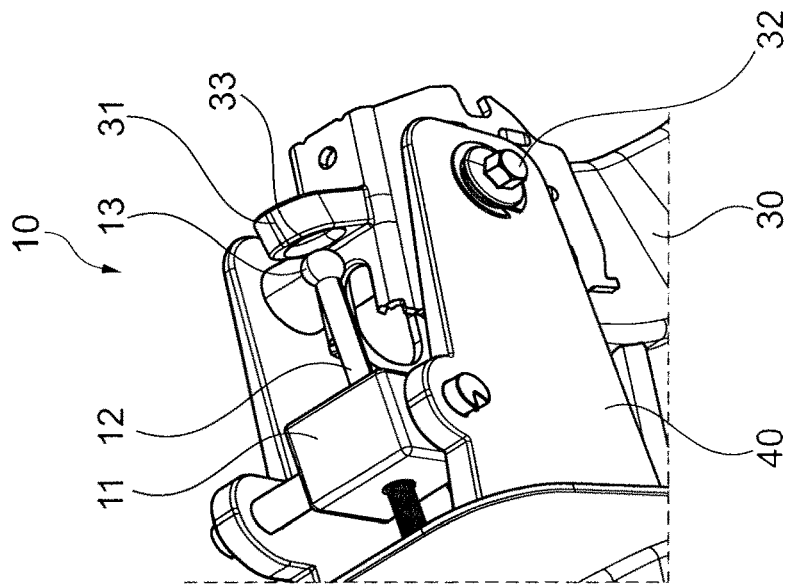

The rod element 12 includes a ball-shaped protrusion 13 facing the rod coupling element 31. The rod coupling element 31 includes a groove 33, preferably a concave-shaped groove 33 to at least partially surround the ball-shaped protrusion 13 of the rod element 12. Accordingly, the press force exerted by the electric motor 11 and transferred by the rod element 12 may be linearly transferred to the rod coupling element 31 effectively (see FIGS. 2a to 2c).

After the rod element 12 of the first locking unit 10 is coupled with the rod coupling element 31 of the pedal arm 30, the rod element 12 is further extended to press the rod coupling element 31. Since the pedal arm 30 is pivotably arranged at the support member 40 and the rod element 12 presses the rod coupling element 31 arranged at the top portion of the pedal arm 30, the pedal arm 30 will be pivoted in a direction of the support member 40 and/or the floor portion 50 of the vehicle (see FIG. 1c). In other words, the press force exerted to the pedal arm 30 for stowing the pedal arm 30 is applied in an opposite direction, in which the pedal arm 30 is retracted (see FIG. 1b).

The electric motor 11 is configured to steadily apply the press force to the rod element 12 such that the pedal arm 30 is securely retracted in the first, i.e. locked position. As a result, more space in a foot area and more comfort can be provided during the autonomous driving of the vehicle.

The pedal system 1 further includes a second locking unit 20 arranged between the floor portion 50 of the vehicle and the pedal arm 30 same as the first locking unit 10. The second locking unit 20 is connected to the pedal arm 30 and configured to release the pedal arm 30 to a second, i.e. released position. The second locking unit 20 includes a spring element 21 which is biased while the rod element 12 of the first locking unit 10 is coupled with the rod coupling element 31 of the pedal arm 30 and locks the pedal arm 30 in the retracted position. In other words, as the pedal arm 30 moves to the retracted position, the pedal arm 30 presses the spring element 21 in the direction of the floor portion 50 of the vehicle.

To facilitate pressing the spring element 21 by the pedal arm 30, a spring force of the spring element 21 is smaller than the press force applied to the rod coupling element 31 of the pedal arm 30. For instance, the electric motor 11 may provide press force of 300 N, whereas the spring element 21 may have a spring force of 200 N.

Since both of the first locking unit 10 and the second locking unit 20 are arranged between the floor portion 50 of the vehicle and the pedal arm 30, no other components of the pedal system 1 besides the pedal arm 30 may be exposed to the foot area of the driver, which allows safe and more comfortable foot area for the driver during the autonomous driving of the vehicle.

FIGS. 3a to 3c show the pedal system 1 in case the autonomous driving is deactivated. If the electronic control unit of the vehicle provides a signal to the first locking unit 10 that the autonomous driving is deactivated, the electric motor 11 reduces the press force gradually. As shown in FIG. 3b, the rod element 12 of the first locking unit 10 is coupled with the rod coupling element 31, even though the pedal arm 30 is deployed. The press force applied on the pedal arm 30 is still higher than the spring force of the spring element 21 during a deployment of the pedal arm 30 to smoothly release the pedal arm 30 to the second/released position. Accordingly, the spring element 21, which was biased in the locked position of the pedal arm 30, may not be released or bounced rapidly, to avoid any accident. For instance, the complete deployment of the pedal arm 30 may take 10 seconds.

However, the spring force of the spring element 21 is high enough to push the pedal arm 30 to the released position. The rod element 12 is disconnected from the pedal arm 30, when the pedal arm 30 is completely deployed to the released/manual operating position (see FIG. 3c).

FIGS. 4a and 4b show a manual operation of the pedal system 1. If the autonomous driving function is deactivated, the rod element 12 of the first locking unit 10 is disconnected from the pedal arm 30 and maintained in the retracted position. Accordingly, the rod element 12 does not interfere a manual operation of the pedal arm 30.

It has to be noted that embodiments of the disclosure are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the disclosure has been illustrated and described in detail in the drawings and description, such illustration and description are to be considered illustrative or exemplary and not restrictive. The disclosure is not limited to the disclosed embodiments. Other variations to the disclosed embodiments can be understood and effected by those skilled in the art in practicing a claimed disclosure, from a study of the drawings, the disclosure, and the dependent claims.

In the claims, the word "comprising" does not exclude other elements or steps, and the indefinite article "a" or "an" does not exclude a plurality. A single processor or other unit may fulfil the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. A pedal system for a vehicle, the pedal system comprising:
    a pedal arm;
    a support member;
    a first locking unit; and
    a second locking unit;
    wherein a rotation axis is arranged at a top portion of the pedal arm;
    wherein the pedal arm is pivotably coupled to the support member at the rotation axis;
    wherein the first locking unit is arranged at an upper portion of the support member relative to the rotation axis and couplable with the top portion of the pedal arm above the rotation axis to move the pedal arm to a first position;
    wherein the second locking unit is connected to the pedal arm below the rotation axis to release the pedal arm to a second position;
    wherein the first locking unit is different from the second locking unit;
    wherein the first locking unit comprises an actuator and a rod element, the pedal arm comprises a rod coupling element, and the actuator is configured to actuate the rod element in order to couple with the rod coupling element of the pedal arm;
    wherein the first locking unit is configured to lock the pedal arm in the first position; and
    wherein the rod element of the first locking unit is disconnected from the pedal arm while the pedal arm is in the second position.

2. The pedal system of claim 1, wherein the first locking unit and the second locking unit are arranged between a floor portion of the vehicle and the pedal arm.

3. The pedal system of claim 1, wherein the rod element comprises a protrusion at an end portion facing the rod coupling element and the rod coupling element comprises a groove formed corresponding to a shape of the protrusion.

4. The pedal system of claim 3, wherein the protrusion of the rod element is ball-shaped and the groove of the rod coupling element has a concave shape.

5. The pedal system of claim 1, wherein the second locking unit comprises a spring element, the spring element being biased while the pedal arm is in the first position.

6. The pedal system of claim 1, wherein the first locking unit is configured to exert higher force than the second locking unit to the pedal arm.

7. The pedal system of claim 1, wherein the first position is a locked position in which the pedal arm is retracted and the second position is a released position of the pedal arm.

8. The pedal system of claim 1, wherein the actuator of the first locking unit is a step motor configured to release the second locking unit to the second position.

9. The pedal system of claim 1, wherein the pedal system is connected to a brake system.

10. A vehicle, comprising:
a pedal system, comprising:
a pedal arm;
a support member;
a first locking unit; and
a second locking unit;
wherein a rotation axis is arranged at a top portion of the pedal arm;
wherein the pedal arm is pivotably coupled to the support member at the rotation axis;
wherein the first locking unit is arranged at an upper portion of the support member relative to the rotation axis and couplable with the top portion of the pedal arm above the rotation axis to move the pedal arm to a first position;
wherein the second locking unit is connected to the pedal arm below the rotation axis to release the pedal arm to a second position;
wherein the first locking unit is different from the second locking unit;
wherein the first locking unit comprises an actuator and a rod element, the pedal arm comprises a rod coupling element, and the actuator is configured to actuate the rod element in order to couple with the rod coupling element of the pedal arm;
wherein the first locking unit is configured to lock the pedal arm in the first position; and
wherein the rod element of the first locking unit is disconnected from the pedal arm while the pedal arm is in the second position; and
a driver assistance system having an autonomous driving function.

11. The vehicle of claim 10, further comprising a control unit, wherein the control unit is configured to send a signal to the pedal system for moving the pedal arm to the first position when the autonomous driving function is active, and is configured to send a signal to the pedal system for releasing the pedal arm to the second position when the autonomous driving function is deactivated.

12. A method for manufacturing a pedal system for a vehicle, the method comprising:
arranging a pedal arm at a support member;
arranging a first locking unit at the support member; and
connecting a second locking unit to the pedal arm;
wherein a rotation axis is arranged at a top portion of the pedal arm;
wherein the pedal arm is pivotably coupled to the support member at the rotation axis;
wherein the first locking unit is arranged at an upper portion of the support member relative to the rotation axis and couplable with the top portion of the pedal arm above the rotation axis to move the pedal arm to a first position;
wherein the second locking unit is connected to the pedal arm below the rotation axis to release the pedal arm to a second position;
wherein the first locking unit is different from the second locking unit;
wherein the first locking unit comprises an actuator and a rod element, the pedal arm comprises a rod coupling element, and the actuator is configured to actuate the rod element in order to couple with the rod coupling element of the pedal arm;
wherein the first locking unit is configured to lock the pedal arm in the first position; and
wherein the rod element of the first locking unit is disconnected from the pedal arm while the pedal arm is in the second position.

13. A method for operating a pedal system for a vehicle, wherein the pedal system comprises a pedal arm, a support member, a first locking unit, and a second locking unit, wherein a rotation axis is arranged at a top portion of the pedal arm, wherein the pedal arm is pivotably coupled to the support member at the rotation axis, wherein the first locking unit is arranged at an upper portion of the support member relative to the rotation axis and couplable with the top portion of the pedal arm above the rotation axis to move the pedal arm to a first position, wherein the second locking unit is connected to the pedal arm below the rotation axis to release the pedal arm to a second position, wherein the first locking unit is different from the second locking unit, wherein the first locking unit comprises an actuator and a rod element, the pedal arm comprises a rod coupling element, and the actuator is configured to actuate the rod element in order to couple with the rod coupling element of the pedal arm, wherein the first locking unit is configured to lock the pedal arm in the first position, wherein the rod element of the first locking unit is disconnected from the pedal arm while the pedal arm is in the second position, and wherein the vehicle comprises a driver assistance system having an autonomous driving function, the method comprising:
sending a signal to the first locking unit when the autonomous driving function is activated;
actuating the first locking unit to couple the first locking unit with the pedal arm and move the pedal arm to the first position;
locking the pedal arm in the first position by means of the first locking unit;
sending a signal to the first locking unit when the autonomous driving function is deactivated; and
moving the pedal arm to the second position by releasing the second locking unit.

* * * * *